United States Patent
Kommula et al.

(10) Patent No.: US 11,102,063 B2
(45) Date of Patent: Aug. 24, 2021

(54) METHODS AND APPARATUS TO CROSS CONFIGURE NETWORK RESOURCES OF SOFTWARE DEFINED DATA CENTERS

(71) Applicant: VMware Inc., Palo Alto, CA (US)

(72) Inventors: Raja Kommula, Cupertino, CA (US); Raj Yavatkar, Saratoga, CA (US); Priyanka Tembey, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/655,625

(22) Filed: Jul. 20, 2017

(65) Prior Publication Data
US 2019/0028345 A1    Jan. 24, 2019

(51) Int. Cl.
*H04L 12/24* (2006.01)
*H04L 12/26* (2006.01)
*H04L 12/46* (2006.01)
*H04L 29/08* (2006.01)

(52) U.S. Cl.
CPC ...... *H04L 41/0816* (2013.01); *H04L 12/4641* (2013.01); *H04L 12/4675* (2013.01); *H04L 43/10* (2013.01); *H04L 43/18* (2013.01); *H04L 67/1097* (2013.01); *H04L 67/10* (2013.01)

(58) Field of Classification Search
CPC .............. H04L 41/0816; H04L 41/0866; H04L 12/4675; H04L 12/4633; H04L 43/18; H04L 67/10; H04L 67/671095
See application file for complete search history.

(56) References Cited

U.S. PATENT DOCUMENTS

| 7,460,472 | B2 | 12/2008 | Le et al. |
| 7,483,376 | B2 | 1/2009 | Banerjee et al. |
| 7,609,721 | B2 | 10/2009 | Rao et al. |
| 7,640,292 | B1 | 12/2009 | Smoot |
| 8,121,135 | B2 | 2/2012 | Thathapudi et al. |
| 8,576,847 | B2 | 11/2013 | Hegde et al. |

(Continued)

FOREIGN PATENT DOCUMENTS

| WO | 2016123293 | | 8/2016 | |
| WO | WO-2016123293 A1 | * | 8/2016 | ......... H04L 12/4633 |

OTHER PUBLICATIONS

International Searching Authority, "International Search Report and Written Opinion," issued in connection with application No. PCT/US2018/043116, dated Oct. 18, 2018, 12 pages.

(Continued)

*Primary Examiner* — Joshua D Taylor
(74) *Attorney, Agent, or Firm* — Hanley, Flight & Zimmerman, LLC

(57) ABSTRACT

Methods and apparatus to cross configure network resources of software defined data centers are disclosed. An example method includes detecting a first configuration change for a first component of a first one of a virtual network or a physical network, the virtual network to provide networking for a virtual computing system, and the physical network to implement the virtual network, identifying, by executing an instruction with a processor, a second component of a second different one of the virtual network or the physical network corresponding to the first component, and making a second configuration change to the second component corresponding to the first configuration change.

12 Claims, 9 Drawing Sheets

(56) References Cited

U.S. PATENT DOCUMENTS

| | | | |
|---|---|---|---|
| 9,787,559 B1* | 10/2017 | Schroeder | H04L 41/5038 |
| 2005/0041635 A1 | 2/2005 | Chung et al. | |
| 2005/0216693 A1 | 9/2005 | Craft | |
| 2006/0080425 A1* | 4/2006 | Wood | H04L 67/1095 |
| | | | 709/223 |
| 2008/0104252 A1 | 5/2008 | Henniger | |
| 2008/0320108 A1* | 12/2008 | Murty | H04W 48/20 |
| | | | 709/220 |
| 2009/0019515 A1 | 1/2009 | Excoffier et al. | |
| 2009/0262741 A1 | 10/2009 | Jungck et al. | |
| 2009/0292858 A1 | 11/2009 | Lambeth et al. | |
| 2011/0032935 A1 | 2/2011 | Yang | |
| 2011/0302346 A1 | 12/2011 | Vahdat et al. | |
| 2012/0051236 A1 | 3/2012 | Hegde et al. | |
| 2012/0213070 A1 | 8/2012 | Lee et al. | |
| 2013/0044748 A1 | 2/2013 | Shah et al. | |
| 2013/0124702 A1 | 5/2013 | Shah et al. | |
| 2013/0145072 A1 | 6/2013 | Venkataraghavan et al. | |
| 2013/0223454 A1 | 8/2013 | Dunbar et al. | |
| 2014/0050217 A1 | 2/2014 | Janakiraman et al. | |
| 2014/0164640 A1 | 6/2014 | Ye et al. | |
| 2014/0241203 A1 | 8/2014 | Elson | |
| 2014/0372616 A1 | 12/2014 | Arisoylu et al. | |
| 2015/0043379 A1 | 2/2015 | Shimokuni et al. | |
| 2015/0071067 A1* | 3/2015 | Martin | G06F 11/2002 |
| | | | 370/235 |
| 2015/0071072 A1 | 3/2015 | Ratzin et al. | |
| 2015/0078152 A1 | 3/2015 | Garg et al. | |
| 2015/0092561 A1 | 4/2015 | Sigoure | |
| 2015/0163117 A1 | 6/2015 | Lambeth et al. | |
| 2015/0277952 A1 | 10/2015 | Lin et al. | |
| 2016/0065423 A1 | 3/2016 | Zhang et al. | |
| 2016/0072642 A1 | 3/2016 | Shih | |
| 2016/0105343 A1 | 4/2016 | Janarthanan et al. | |
| 2016/0105364 A1 | 4/2016 | Kanonakis et al. | |
| 2016/0283259 A1 | 9/2016 | Mehta | |
| 2017/0149880 A1 | 5/2017 | Lochhead et al. | |
| 2017/0163539 A1 | 6/2017 | Sreeramoju et al. | |
| 2017/0195226 A1 | 7/2017 | Cho et al. | |
| 2017/0244651 A1 | 8/2017 | Saxton | |
| 2017/0286167 A1 | 10/2017 | Zhu | |
| 2017/0331740 A1 | 11/2017 | Levy et al. | |
| 2017/0353874 A1 | 12/2017 | Harrang et al. | |
| 2017/0366401 A1* | 12/2017 | Jiang | H04L 41/0866 |
| 2018/0004558 A1 | 1/2018 | Das Sharma | |
| 2018/0013583 A1* | 1/2018 | Rubenstein | H04L 12/4633 |
| 2018/0026895 A1 | 1/2018 | Wang et al. | |
| 2018/0091591 A1 | 3/2018 | Puri et al. | |
| 2018/0097734 A1 | 4/2018 | Boutros et al. | |
| 2018/0139101 A1 | 5/2018 | Puri | |
| 2018/0183683 A1 | 6/2018 | Geng et al. | |
| 2018/0241664 A1 | 8/2018 | Singh et al. | |
| 2018/0316618 A1 | 11/2018 | Brown et al. | |
| 2018/0343162 A1 | 11/2018 | Ohsuga et al. | |
| 2018/0359131 A1 | 12/2018 | Cheng et al. | |
| 2018/0359134 A1* | 12/2018 | Pech | H04L 63/101 |
| 2018/0373553 A1 | 12/2018 | Connor et al. | |
| 2019/0028342 A1 | 1/2019 | Kommula et al. | |
| 2019/0028382 A1 | 1/2019 | Kommula et al. | |
| 2019/0028400 A1 | 1/2019 | Kommula et al. | |

OTHER PUBLICATIONS

United States Patent and Trademark Office, "Non-Final Office Action," issued in connection with U.S. Appl. No. 15/655,632, dated Dec. 21, 2018, 16 pages.

United States Patent and Trademark Office, "Non-Final Office Action," dated Apr. 11, 2019 in connection with U.S. Appl. No. 15/655,197 (37 pages).

United States Patent and Trademark Office, "Final Rejection," dated Jun. 10, 2019 in connection with U.S. Appl. No. 15/655,632 (28 pages).

United States Patent and Trademark Office, "Non-Final Office Action," issued in connection with U.S. Appl. No. 15/655,193, dated Jan. 29, 2019, 31 pages.

United States Patent and Trademark Office, "Final Office Action," dated Jul. 22, 2019 in connection with U.S. Appl. No. 15/655,193, 15 pages.

United States Patent and Trademark Office, "Notice of Allowance," issued in connection with U.S. Appl. No. 15/655,197, dated Aug. 30, 2019, 8 pages.

United States Patent and Trademark Office, "Non-Final Office Action," issued in connection with U.S. Appl. No. 15/655,632, dated Nov. 1, 2019, 10 pages.

United States Patent and Trademark Office, "Non-Final Rejection," issued in connection with U.S. Appl. No. 15/655,193, dated Dec. 26, 2019, 22 pages.

United States Patent and Trademark Office, "Notice of Allowance," issued in connection with U.S. Appl. No. 15/655,193, dated Jul. 9, 2020, 9 pages.

United States Patent and Trademark Office, "Notice of Allowance," issued in connection with U.S. Appl. No. 15/655,632, dated Apr. 15, 2020, 17 pages.

* cited by examiner

```
602 ⎰ ALL_SWITCHES = {ALL THE SWITCHES IN VCF INVENTORY}
    ⎨ VLAN_SWITCHES = {}
    ⎩ VLAN_PORTS = {}

604 ⎧ FOREACH S IN ALL_SWITCHES
    ⎪     ALL_PORTS = {ALL PORTS PRESENT IN S}
    ⎪
    ⎨     FOREACH P IN ALL_PORTS
    ⎪         INSTALL PROBE_ACL ON P
    ⎪         CLEAR PROBE_ACL HIT COUNTER
    ⎪     ENDFOR
    ⎩ ENDFOR

606 { FROM VDS SEND PROBE PACKET

608 ⎧ FOREACH S IN ALL_SWITCHES
    ⎪     ALL_PORTS = {ALL PORTS PRESENT IN S}
    ⎪
    ⎪     SWITCH_HAS_VLAN = FALSE
    ⎪     FOREACH P IN ALL_PORTS
    ⎪         IF PROBE_ACL HIT COUNTER > 0
    ⎪             VLAN_PORTS += (S, P)
    ⎨             SWITCH_HAS_VLAN = TRUE
    ⎪         ENDIF
    ⎪     ENDFOR
    ⎪
    ⎪     IF SWITCH_HAS_VLAN == TRUE
    ⎪         VLAN_SWITCHES += S
    ⎪     ENDIF
    ⎩ ENDFOR

CLEAN UP PROBE_ACL ON ALL SWITCHES
```

FIG. 6

702 { GET VLAN_PORTS THAT BELONG TO A VLAN
       (E.G., SEE PSEUDO-CODE OF FIG. 6)

704 { FOREACH (S, P) IN VLAN_PORTS
         INSTALL PROBE_ACL ON SWITCH S AND PORT P
         CLEAR PROBE_ACL HIT COUNTER
     ENDFOR

706 { FROM VDS SEND PROBE PACKET WITH PACKET SIZE SET TO NEW MTU

708 { /* CONFIGURE MTU ON INTERFACES THAT DID NOT
         RECEIVE THE PROBE PACKET */
     FOREACH (S, P) IN VLAN_PORTS
         IF PROBE_ACL HIT COUNTER == 0
             CHANGE MTU ON (S, P) TO NEW MTU
         ENDIF
     ENDFOR

CLEAN UP PROBE_ACL ON ALL SWITCHES

FIG. 7

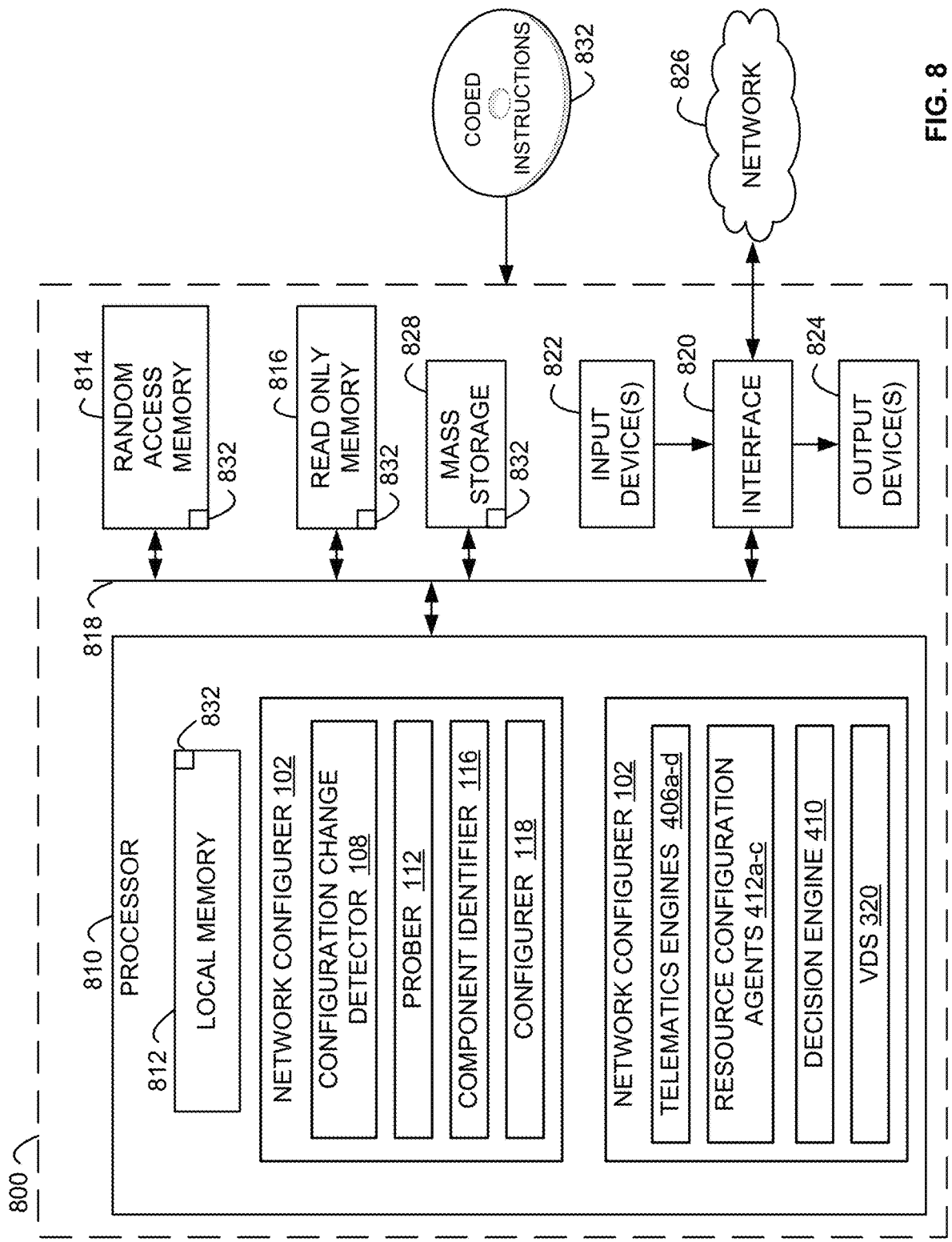

METHODS AND APPARATUS TO CROSS CONFIGURE NETWORK RESOURCES OF SOFTWARE DEFINED DATA CENTERS

FIELD OF THE DISCLOSURE

The present disclosure relates generally to cloud computing and, more particularly, to methods and apparatus to cross configure network resources of software defined data centers.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 6 is example pseudo-code representing example computer-readable instructions that may be executed to implement the example prober of FIGS. 1 and 4 to identify physical switches associated with a virtual network.

FIG. 7 is additional example pseudo-code representing example computer-readable instructions that may be executed to implement the example prober of FIGS. 1 and 4 to identify physical switches associated with a virtual network.

FIG. 8 illustrates an example processor platform structured to execute the example computer-readable instructions of FIGS. 5A, 5B, 6 and 7 to implement the example network configurer of FIGS. 1 and 4.

Figure 1:
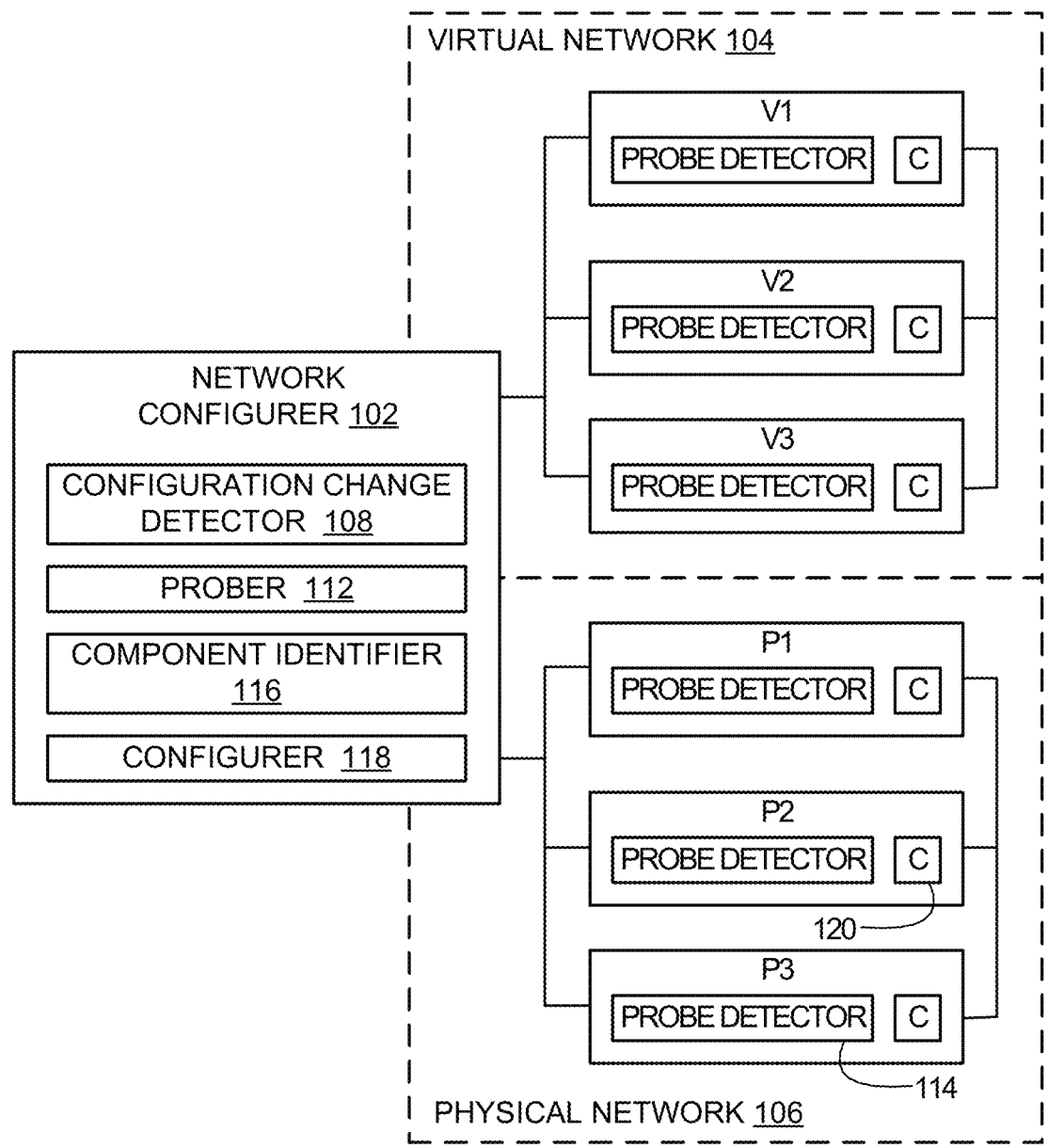
FIG. 1 is an example environment in which a network configurer in accordance with the teachings of this disclosure configures physical and virtual network resources in software defined data centers.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

In known systems, the cross configuration of a virtual network and the physical network on which the virtual network is based can be different. For example, if the operator of a virtual network changes one or more parameters, such as virtual storage area network (VSAN) shares, maximum transmission unit (MTU), network I/O control (NIOC), link aggregation control protocol (LACP), etc., such changes are only effective for the virtual network if/when the underlying physical network is correspondingly configured, or vice versa. In known systems, neither the operator of the virtual network, nor the operator of the physical network has sufficient visibility into the other network to keep their configurations compatible. In contrast to known systems, examples disclosed herein detect when changes take place in, for example, the virtual network, and automatically analyze the physical network to identify the aspects of the physical network involved in implementing the identified change in the virtual network, and then configure the physical network. Changes in the physical network can be likewise carried into the virtual network. By analyzing the affected network, the operator of either network can be assured that any intended changes are appropriately made in the other network.

Reference will now be made in detail to non-limiting examples of this disclosure, examples of which are illustrated in the accompanying drawings. The examples are described below by referring to the drawings.

FIG. 1 is an example software defined data center environment (SDDC) 100 in which an example network configurer 102 in accordance with the teachings of this disclosure configures resources of an example virtual network 104, and an example physical network 106. In the illustrated example of FIG. 1, the virtual network 104 is implemented as a virtual network constructed on (e.g., based on, executing on top of, etc.) the example physical network 106, and does not include any physical components. While some examples are described with reference to a combination of a virtual network and a physical network, the teachings of this disclosure can be used with other combinations of network (e.g., physical+physical, virtual+virtual, etc.), and/or combinations of more than two networks. Moreover, while one network configurer 102 is shown in the example of FIG. 1, more than one network configurer 102 may be implemented. For example, a network configurer 102 may be implemented for each of the virtual network 104 and the physical network 106.

The example virtual network 104 includes one or more virtual components, three of which are designated at reference numbers V1, V2 and V3. Example virtual components V1-V3 include, but are not limited to, virtual switches (e.g., a virtual top-of-rack (ToR) switch, a virtual spline switch, etc.), virtual switch ports, virtual network interfaces (e.g., a virtual network interface port, a virtual network interface card (NIC), etc.), etc. The example physical network 106 includes one or more components, three of which are designated at reference numbers P1, P2 and P3. Example components P1-P3 include, but are not limited to, switches (e.g., a ToR switch, a spline switch, etc.), switch ports, network interfaces (e.g., a network interface port, a NIC, etc.), etc.

To manage network resources of the example virtual network 104 and the example physical network 106, the example SDDC environment 100 of FIG. 1 includes the example network configurer 102. To detect network configuration changes, the example network configurer 102 includes an example configuration change detector 108. In some examples, the example configuration change detector 108 of FIG. 1 detects when configuration changes have occurred by monitoring an operator interface for network configuration change commands. Additionally, and/or alternatively, configuration changes are detected by detecting network configuration change packets in the virtual network 104 and/or the physical network 106 flowing to one or more of the components V1-V3, P1-P3.

To analyze the networks 104 and 106 to identify components V1-V3, P1-P3 associated with a detected network configuration change, the example network configurer 102 includes an example component identifier 116 and an example prober 112. Each of the example components V1-V3, P1-P3 includes an example probe detector, one of which is designated at reference numeral 114. The example probe detectors 114 of FIG. 1 listen for probe packets sent by the prober 112, and record probe packet receipt information and, in some examples, how many packets were received. In some examples, the probe packet(s) include a unique source media access control (MAC) address that can be used by a probe access control list (ACL) of the probe detectors 114 to determine if a probe passed through a network port.

Using, for example, probe packets receipt information obtained from the probe detectors 114, the component identifier 116 can identify which of the components V1-V3, P1-P3 received probe packets and, thus, are in need of configuration. For example, when a configuration change to a virtual local area network (VLAN) or a virtual extensible local area network (VXLAN) in the virtual network 104 is detected, the example prober 112 can send one or more probe packets on the VLAN to probe the scope of the VLAN on the physical network 106. That is, to determine the extent of ports and/or switches on which the VLAN is implemented. The components V1-V3, P1-P3 that receive the probe packets are associated with the VLAN, and are the components V1-V3, P1-P3 needing corresponding network resource configuration change(s).

To effect network configuration changes, the example network configurer 102 includes an example configurer 118. For each of the components identified by the component identifier 116, the example configurer 118 of FIG. 1 makes changes corresponding to the configuration information (e.g., configuration settings, parameters, etc.), some of which is designated at reference number 120, to the components V1-V3, P1-P3 identified by the component identifier 116. In some examples, the configurer 118 uses APIs of the identified components to make the changes. Additionally, and/or alternatively, configuration packets may be sent to the identified components. In some examples, an operator confirms the configuration changes before they are made.

While an example manner of implementing the example network configurer 102 is illustrated in FIG. 1, one or more of the elements, processes and/or devices illustrated in FIG. 1 may be combined, divided, re-arranged, omitted, eliminated and/or implemented in any other way. Further, the example configuration change detector 108, the example prober 112, the example component identifier 116, the example configurer 118 and/or, more generally, the example network configurer 102 of FIG. 1 may be implemented by hardware, software, firmware and/or any combination of hardware, software and/or firmware. Thus, for example, any of e example configuration change detector 108, the example prober 112, the example component identifier 116, the example configurer 118 and/or, more generally, the example network configurer 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example configuration change detector 108, the example prober 112, the example component identifier 116, the example configurer 118 and/or, more generally, the example network configurer 102 of FIG. 1 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example network configurer 102 of FIG. 1 may include one or more elements, processes and/or devices in addition to, or instead of, those illustrated in FIG. 1, and/or may include more than one of any or all of the illustrated elements, processes and devices.

Other example implementations of the example SDDC environment 100, the example network configurer 102, the example virtual network 104, and the example physical network 106 of FIG. 1 will now be made in detail to non-limiting examples of cloud computing, and SDDCs, examples of which are illustrated in the accompanying drawings.

Cloud computing is based on the deployment of many physical resources across a network, virtualizing the physical resources into virtual resources, and provisioning the virtual resources in SDDCs for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on Hyper-Converged Infrastructure (HCI). In examples disclosed herein, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein may be used with one or more different types of virtualization environments. Three example types of virtualization environment are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs, virtual storage, virtual networks and their control/management counterparts) and the physical infrastructure (servers, physical storage, network switches).

Prior converged and hyper-converged systems enable deploying and operating private clouds by offering an integrated system. However, most of such prior products lack a single governing entity that has visibility into and end-to-end control over an entire (virtual and physical) infrastructure. The lack of a single governing entity makes it difficult to correlate related events such as relating switch congestion to a particular traffic source in a VM, or taking preemptive traffic management action (e.g., a scheduled VM migration event could be used to proactively select an end-to-end network path that does not impact the software-defined data storage traffic), or reflecting NIOC (e.g., VMWARE® ESXI™ NIOC) configurations at the switch level for end-to-end Quality of Storage (QoS) control during traffic events like software-defined data storage rebalancing. Examples disclosed herein overcome limitations of prior systems by enabling observing and controlling both virtual and physical infrastructures of self-contained private clouds. Examples disclosed herein collect telematics data from switches, hosts, and hypervisor-based virtual infrastructure and take remedial actions based on telematics analyses and user configured policies.

Figure 2:
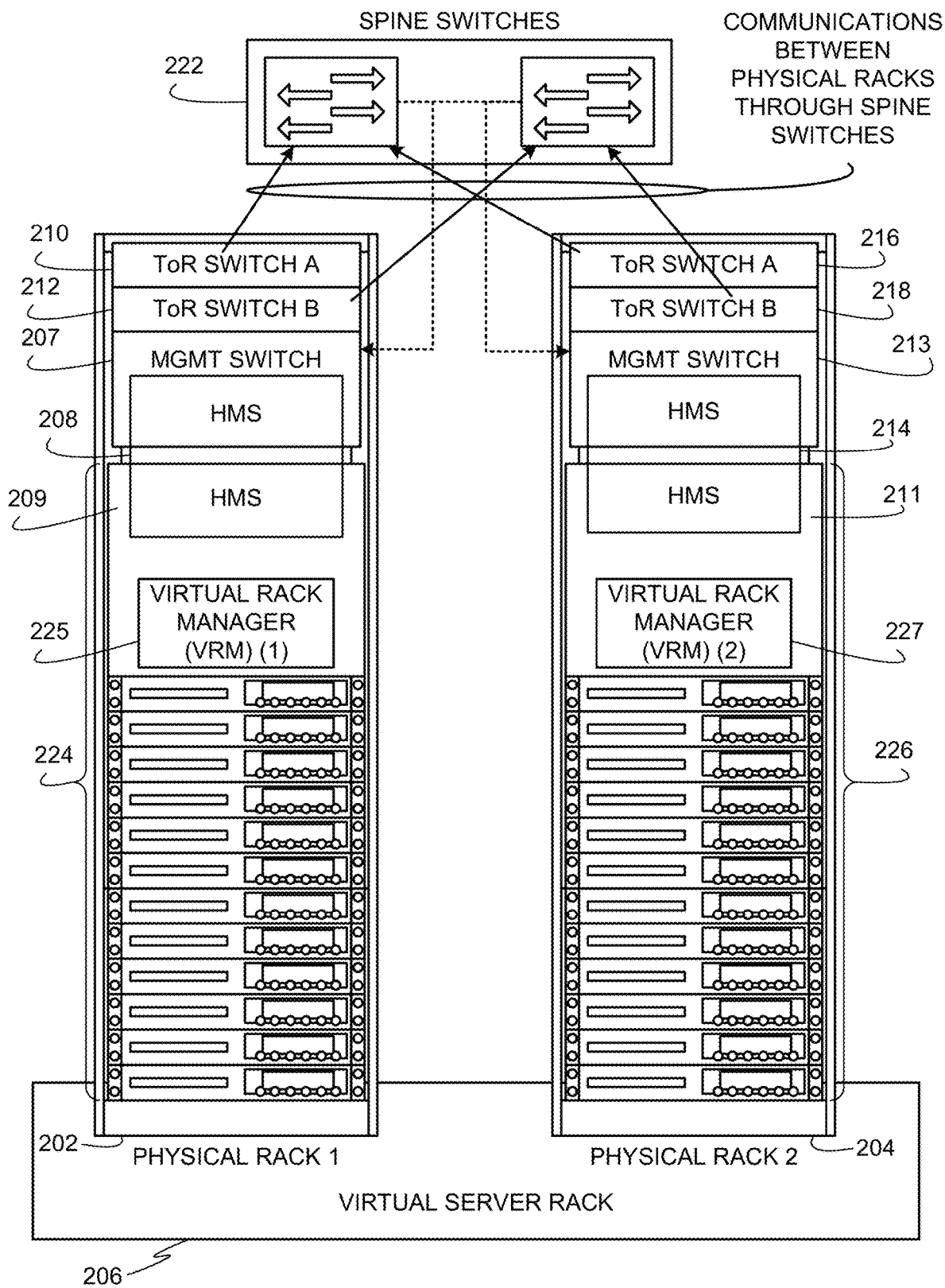
FIG. 2 depicts example physical racks in an example virtual server rack deployment.

Examples disclosed herein may be employed with HCI-based SDDCs deployed using virtual server rack systems such as the virtual server rack 206 of FIG. 2. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 2 and 3, multi-rack deployments can include Top-of-the-Rack (ToR) switches (e.g., leaf switches) and spine switches connected using a Leaf-Spine architecture. A virtual server rack system also includes software-defined data storage (e.g., storage area network (SAN), VMWARE® VIRTUAL SAN™) distributed across multiple hosts for redundancy and virtualized networking software (e.g., VMWARE NSX™).

A drawback of some virtual server rack systems is that different hardware components located therein can be procured from different equipment vendors, and each equipment vendor can have its own independent OS (OS) installed on its hardware. For example, physical hardware resources include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/ network systems that meet specifications of end users or customers. The white labeling, or unbranding by original manufacturers, of such equipment enables third-party system integrators to market their end-user integrated systems using the third-party system integrators' branding. In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO and ARISTA NETWORKS™, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration may require additional network bandwidth, which may not be released until the reconfiguration is complete.

Examples disclosed herein provide HCI-based SDDCs with system-level governing features that can actively monitor and manage different hardware and software components of a virtual server rack system even when such different hardware and software components execute different OSs. As described in connection with FIG. 3, major components of a virtual server rack system include a hypervisor, network virtualization software, storage virtualization software (e.g., software-defined data storage), a physical network OS, and external storage. In some examples, the storage virtualization (e.g., VMWARE® VIRTUAL SAN™) is integrated with the hypervisor. In examples in which the physical network OS is isolated from the network virtualization software, the physical network is not aware of events occurring in the network virtualization environment and the network virtualization environment is not aware of events occurring in the physical network.

FIG. 2 depicts example physical racks 202, 204 in an example deployment of a virtual server rack 206. The virtual server rack 206 of the illustrated example enables abstracting hardware resources (e.g., physical hardware resources 224, 226). In some examples, the virtual server rack 206 includes a set of physical units (e.g., one or more racks) with each unit including hardware such as server nodes (e.g., compute+storage+network links), network switches, and, optionally, separate storage units. From a user perspective, the example virtual server rack 206 is an aggregated pool of logic resources exposed as one or more ESXI® clusters along with a logical storage pool and network connectivity. In examples disclosed herein, a cluster is a server group in a virtual environment. For example, an ESXI® cluster is a group of physical servers in the physical hardware resources that run ESXI® hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 202 has an example ToR switch A 210, an example ToR switch B 212, an example management switch 207, and an example server host node(0) 209. In the illustrated example, the management switch 207 and the server host node(0) 209 run a hardware management system (HMS) 208 for the first physical rack 202. The second physical rack 204 of the illustrated example is also provided with an example ToR switch A 216, an example ToR switch B 218, an example management switch 213, and an example server host node (0) 211. In the illustrated example, the management switch 213 and the server host node (0) 211 run an HMS 214 for the second physical rack 204.

In the illustrated example, the HMS 208, 214 connects to server management ports of the server host node(0) 209, 211 (e.g., using a baseboard management controller (BMC)), connects to ToR switch management ports (e.g., using 1 gigabits per second (Gbps) links) of the ToR switches 210, 212, 216, 218, and also connects to spine switch management ports of one or more spine switches 222. In the illustrated example, the ToR switches 210, 212, 216, 218, implement leaf switches such that the ToR switches 210, 212, 216, 218, and the spine switches 222 are in communication with one another in a leaf-spine switch configuration. These example connections form a non-routable private Internet protocol (IP) management network for out-of-band (OOB) management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server NIC ports (e.g., using 10 Gbps links) of server hosts in the physical racks 202, 204 for downlink communications and to the spine switch(es) 222 (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208, 214 is provided with in-band (TB) connectivity to individual server nodes (e.g., server nodes in example physical hardware resources 224, 226) of the physical rack 202, 204. In the illustrated example, the IB connection interfaces to physical hardware resources 224, 226 via an OS running on the server nodes using an OS-specific API such as VMware vSphere® API, command line interface (CLI), and/or interfaces such as Common Information Model from Distributed Management Task Force (DMTF).

Example OOB operations performed by the HMS 208, 214 include discovery of new hardware, bootstrapping, remote power control, authentication, hard resetting of non-responsive hosts, monitoring catastrophic hardware failures, and firmware upgrades. The example HMS 208, 214 uses IB management to periodically monitor status and health of the physical resources 224, 226 and to keep server objects and switch objects up to date. Example IB operations performed by the HMS 208, 214 include controlling power state, accessing temperature sensors, controlling Basic Input/Output System (BIOS) inventory of hardware (e.g., central processing units (CPUs), memory, disks, etc.), event monitoring, and logging events.

The HMSs 208, 214 of the corresponding physical racks 202, 204 interface with virtual rack managers (VRMs) 225, 227 of the corresponding physical racks 202, 204 to instantiate and manage the virtual server rack 206 using physical hardware resources 224, 226 (e.g., processors, NICs, servers, switches, storage devices, peripherals, power supplies, etc.) of the physical racks 202, 204. In the illustrated example, the VRM 225 of the first physical rack 202 runs on a cluster of three server host nodes of the first physical rack 202, one of which is the server host node(0) 209. In some examples, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, the VRM 227 of the second physical rack 204 runs on a cluster of three server host nodes of the second physical rack 204, one of which is the server host node(0) 211. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

The VRM 225 of the first physical rack 202 runs on a cluster of three server host nodes of the first physical rack 202 using a high availability (HA) mode configuration. In addition, the VRM 227 of the second physical rack 204 runs on a cluster of three server host nodes of the second physical rack 204 using the HA mode configuration. Using the HA mode in this manner, enables fault tolerant operation of the VRM 225, 227 in the event that one of the three server host nodes in the cluster for the VRM 225, 227 fails. Upon failure of a server host node executing the VRM 225, 227, the VRM 225, 227 can be restarted to execute on another one of the hosts in the cluster. Therefore, the VRM 225, 227 continues to be available even in the event of a failure of one of the server host nodes in the cluster.

In examples disclosed herein, a CLI and APIs are used to manage the ToR switches 210, 212, 216, 218. For example, the HMS 208, 214 uses CLI/APIs to populate switch objects corresponding to the ToR switches 210, 212, 216, 218. On HMS bootup, the HMS 208, 214 populates initial switch objects with statically available information. In addition, the HMS 208, 214 uses a periodic polling mechanism as part of an HMS switch management application thread to collect statistical and health data from the ToR switches 210, 212, 216, 218 (e.g., Link states, Packet Stats, Availability, etc.). There is also a configuration buffer as part of the switch object which stores the configuration information to be applied on the switch.

The HMS 208, 214 of the illustrated example of FIG. 2 is a stateless software agent responsible for managing individual hardware resources in a physical rack 202, 204. Examples of hardware elements that the HMS 208, 214 manages are servers and network switches in the physical rack 202, 204. In the illustrated example, the HMS 208, 214 is implemented using Java on Linux so that an OOB management portion of the HMS 208, 214 runs as a Java application on a white box management switch (e.g., the management switch 207, 213) in the physical rack 202, 204. However, any other programming language and any other OS may be used to implement the HMS 208, 214.

Figure 3:
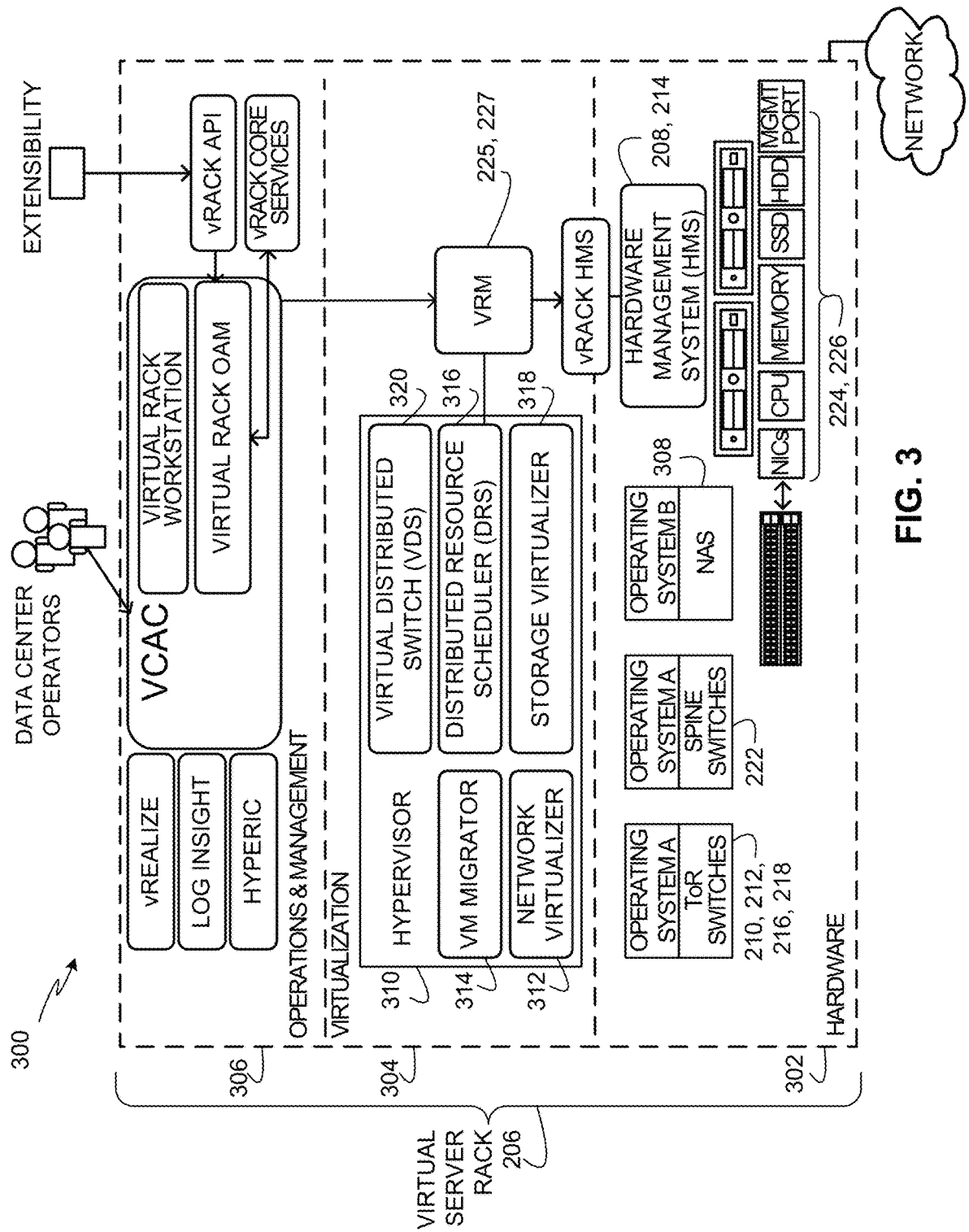
FIG. 3 depicts an example architecture to configure and deploy the example virtual server rack of FIG. 2.

FIG. 3 depicts an example virtual server rack architecture 300 that may be used to configure and deploy the virtual server rack 206 of FIG. 2. The example architecture 300 of FIG. 3 includes a hardware layer 302, a virtualization layer 304, and an operations and management layer (OAM) 306. In the illustrated example, the hardware layer 302, the virtualization layer 304, and the OAM layer 306 are part of the example virtual server rack 206 of FIG. 2. The virtual server rack 206 of the illustrated example is based on the physical racks 202, 204 of FIG. 2. The example virtual server rack 206 configures the physical hardware resources 224, 226, virtualizes the physical hardware resources 224, 226 into virtual resources, provisions virtual resources for use in providing cloud-based services, and maintains the physical hardware resources 224, 226 and the virtual resources.

The example hardware layer 302 of FIG. 3 includes the HMS 208, 214 of FIG. 2 that interfaces with the physical hardware resources 224, 226 (e.g., processors, NICs, servers, switches, storage devices, peripherals, power supplies, etc.), the ToR switches 210, 212, 216, 218 of FIG. 2, the spine switches 222 of FIG. 2, and network attached storage (NAS) hardware 308. The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 202, 204 including the dual-redundant management switches 207, 213 and dedicated management ports attached to the server host nodes(0) 209, 211 and the ToR switches 210, 212, 216, 218. In the illustrated example, one instance of the HMS 208, 214 runs per physical rack 202, 204. For example, the HMS 208, 214 may run on the management switch 207, 213 and the server host node(0) 209, 211 installed in the example physical rack 202 of FIG. 2. In the illustrated example of FIG. 2 both of the HMSs 208, 214 are provided in corresponding management switches 207, 213 and the corresponding server host nodes(0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes(0) 209, 211 on which the other HMS 208, 214 executes. In some examples, to achieve seamless failover, two instances of an HMS 208, 214 run in a single physical rack 202, 204. In such examples, the physical rack 202, 204 is provided with two management switches, and each of the two management switches runs a separate instance of the HMS 208, 214. In such examples, the physical rack 202 of FIG. 2 runs two instances of the HMS 208 on two separate physical hardware management switches and two separate server host nodes(0), and the physical rack 204 of FIG. 2 runs two instances of the HMS 214 on two separate physical hardware management switches and two separate server host nodes(0). In this manner, for example, one of the instances of the HMS 208 on the physical rack 202 serves as the primary HMS 208 and the other instance of the HMS 208 serves as the secondary HMS 208. The two instances of the HMS 208 on two separate management switches and two separate server host nodes(0) in the physical rack 202 (or the two instances of the HMS 214 on two separate management switches and two separate server host nodes(0) in the physical rack 204) are connected over a point-to-point, dedicated Ethernet link which carries heartbeats and memory state synchronization between the primary and secondary HMS instances.

The example virtualization layer 304 includes the VRM 225, 227. The example VRM 225, 227 communicates with the HMS 208, 214 to manage the physical hardware resources 224, 226. The example VRM 225, 227 creates the example virtual server rack 206 out of underlying physical hardware resources 224, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC life-cycle, and translates logical resource provisioning to allocation of physical hardware resources 224, 226. The example VRM 225, 227 interfaces with an example hypervisor 310 of the virtualization layer 304. The example hypervisor 310 is installed and runs on server hosts in the example physical resources 224, 226 to enable the server hosts to be partitioned into multiple logical servers to create VMs. In some examples, the hypervisor 310 may be implemented using a ESXI™ hypervisor available as a component of a vSphere virtualization suite developed and provided by VMware, Inc. The vSphere virtualization suite is a collection of components to setup and manage a virtual infrastructure of servers, networks, and other resources In the illustrated example of FIG. 3, the hypervisor 310 is shown having a number of virtualization components executing thereon including an example network virtualizer 312, an example VM migrator 314, an example distributed resource scheduler (DRS) 316, an example storage virtualizer 318, and an example virtual distributed switch (VDS) 320. In the illustrated example, the VRM 225, 227 communicates with these components to manage and present the logical view of underlying resources such as hosts and clusters. The example VRM 225, 227 also uses the logical view for orchestration and provisioning of workloads.

The example network virtualizer 312 virtualizes network resources such as physical hardware switches (e.g., the management switches 207, 213 of FIG. 2, the ToR switches 210, 212, 216, 218, and/or the spine switches 222) to provide software-based virtual networks. The example network virtualizer 312 enables treating physical network resources (e.g., switches) as a pool of transport capacity. In some examples, the network virtualizer 312 also provides network and security services to VMs with a policy driven approach. The network virtualizer 312 includes a number of components to deploy and manage virtualized network resources across servers, switches, and clients. For example, the network virtualizer 312 includes a network virtualization manager that functions as a centralized management component of the network virtualizer 312 and runs as a virtual appliance on a server host. In some examples, the network virtualizer 312 may be implemented using an NSX network virtualization platform that includes a number of components including an NSX network virtualization manager.

The example VM migrator 314 is provided to move or migrate VMs between different hosts without losing state during such migrations. For example, the VM migrator 314 allows moving an entire running VM from one physical server to another with substantially little or no downtime. The migrating VM retains its network identity and connections, which results in a substantially seamless migration process. The example VM migrator 314 enables transferring the VM's active memory and precise execution state over a high-speed network, which allows the VM to switch from running on a source server host to running on a destination server host.

The example DRS 316 is provided to monitor resource utilization across resource pools, to manage resource allocations to different VMs, to deploy additional storage capacity to VM clusters with substantially little or no service disruptions, and to work with the VM migrator 314 to automatically migrate VMs during maintenance with substantially little or no service disruptions.

The example storage virtualizer 318 is software-defined storage for use in connection with virtualized environments. The example storage virtualizer 318 clusters server-attached hard disk drives (HDDs) and solid state drives (SSDs) to create a shared datastore for use as virtual storage resources in virtual environments. In some examples, the storage virtualizer 318 may be implemented using a VMWARE® VIRTUAL SAN™ network data storage virtualization component developed and provided by VMware, Inc.

Figure 4:
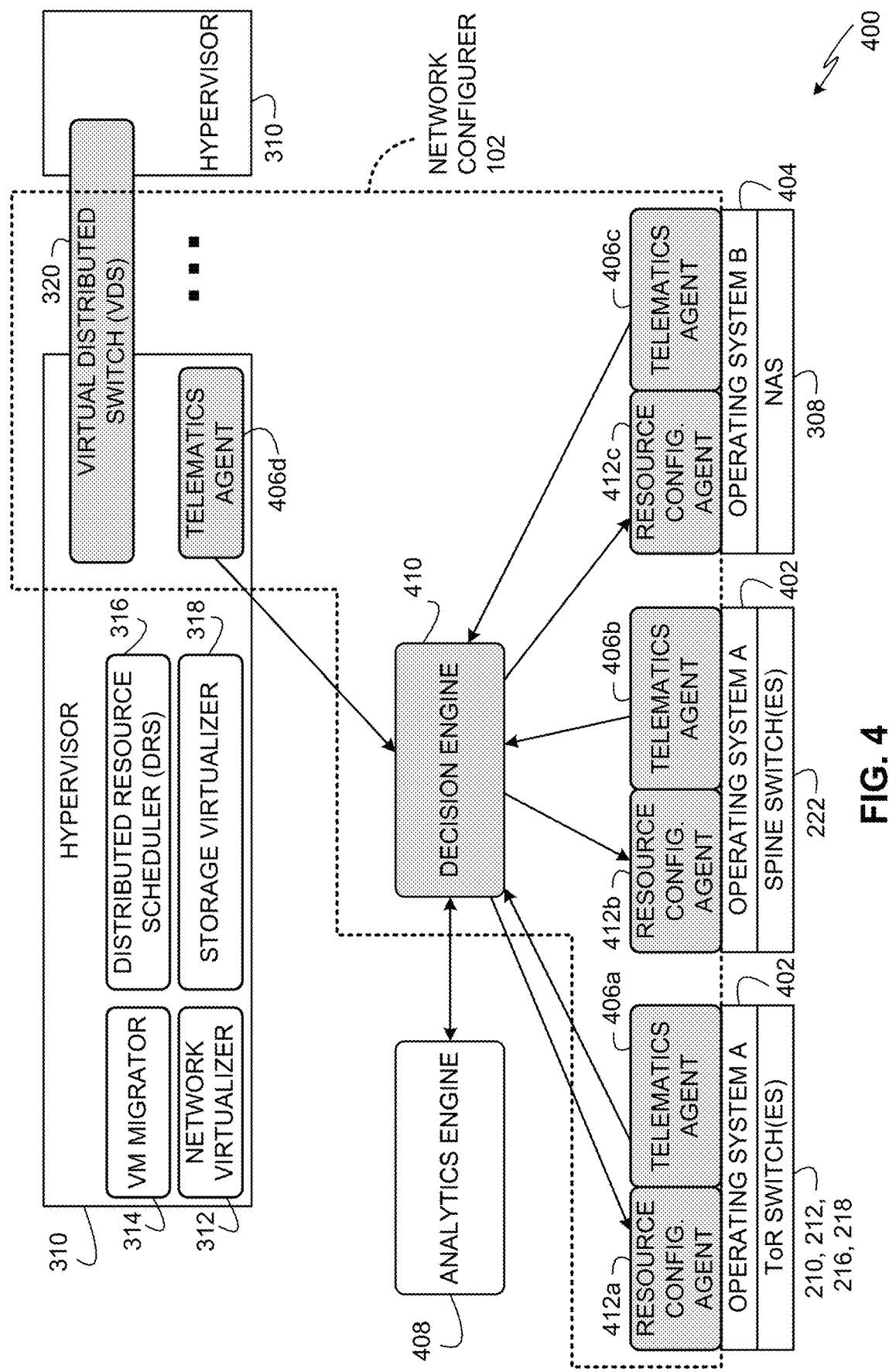
FIG. 4 depicts an example virtual cloud management system that may be used to implement examples disclosed herein.

The example VDS 320 implements software-defined networks for use in connection with virtualized environments in the form of a networking module for the hypervisor 310. In some examples, the VDS 320 is distributed across multiple hosts, where there is a separate instance of the hypervisor 310, as shown in FIG. 4.

The virtualization layer 304 of the illustrated example, and its associated components are configured to run VMs. However, in other examples, the virtualization layer 304 may additionally, and/or alternatively, be configured to run containers. For example, the virtualization layer 304 may be used to deploy a VM as a data computer node with its own guest OS on a host using resources of the host. Additionally, and/or alternatively, the virtualization layer 304 may be used to deploy a container as a data computer node that runs on top of a host OS without the need for a hypervisor or separate OS.

In the illustrated example, the OAM layer 306 is an extension of a VMWARE VCLOUD® AUTOMATION CENTER™ (VCAC) that relies on the VCAC functionality and also leverages utilities such as VMWARE VREALIZE™ LOG INSIGHT™, and VMWARE VCENTER™ HYPERIC® to deliver a single point of SDDC operations and management. The example OAM layer 306 is configured to provide different services such as health monitoring service, capacity planner service, maintenance planner service, events and operational view service, and virtual rack application workloads manager service.

Example components of FIG. 3 may be implemented using products developed and provided by VMware, Inc. Alternatively, some or all of such components may alternatively be supplied by components with the same and/or similar features developed and/or provided by other virtualization component developers.

FIG. 4 depicts an example virtual cloud management system 400 that may be used to implement examples disclosed herein. The example virtual cloud management system 400 includes the example network virtualizer 312, the example VM migrator 314, the example DRS 316, the example storage virtualizer 318, and the example VDS 320 of FIG. 3. In some examples, the example VDS 320 implements the example prober 112 of FIG. 1 by sending, in response to detection of a network configuration change, sending probe packets containing a unique source MAC address configured into probe ACLs of network components.

FIG. In the illustrated example, the virtual cloud management system 400 is implemented using a SDDC deployment and management platform such as the VMware Cloud Foundation (VCF) platform developed and provided by VMware, Inc. The example virtual cloud management system 400 manages different parameters of the ToR switches 210, 212, 216, 218, the spine switches 222, and the NAS 308. The example virtual cloud management system 400 commands different components even when such components run different OSs. For example, the ToR switches 210, 212, 216, 218 and the spine switches 222 run OS A 402, and the NAS 308 runs OS B 404. In the illustrated example, the OS A 402 and the OS B 404 are different types of OSs. For example, the OS A 402 and the OS B 404 may be developed by different companies, may be developed for different hardware, maybe developed for different functionality, may include different kernels, and/or may be different in other ways. In some examples, the OS A 402 may be implemented using a CISCO® NX-OS (developed and provided by Cisco Systems, Inc.) that can be run on leaf switches and/or spine switches, and the OS B 404 may be implemented using an EMC NAS OS (developed and provided by EMC Corporation) that runs on network attached storage devices. In the illustrated example of FIG. 4, OS A 402 and OS B 404 are unaware of the events occurring in the hypervisor 310. However, examples disclosed herein enable monitoring different OSs across physical resources at a system level to provides cooperative inter-OS and inter-resource management.

The example virtual cloud management system 400 includes example telematics agents 406a-d, an example analytics engine 408, an example decision engine 410, and example resource configuration agents 412a, 412b and 412c. In the illustrated example, the telematics agents 406a-d are provided to collect information from different hardware resources and provide the information to the example decision engine 410. In the illustrated example, the telematics agents 406a-d are provided as add-on modules installable and executable on the different components. For example, the telematics agent 406a is installed and executed on the OS A 402 of the ToR switches 210, 212, 216, 218, the example telematics agent 406b is installed and executed on the OS A 402 of the spine switches 222, the example telematics agent 406c is installed and executed on the OS B 404 of the NAS 308, and the example telematics agent 406d is installed and executed on the hypervisor 310. In the illustrated example, the telematics agents 406a-d run on respective components while creating substantially little or no interference to the OSs of those components. For example, the telematics agents 406a-d may be implemented as a set of ACL rules that operate as data collection rules to capture signatures of events that are happening in the virtual cloud management system 400. Such data collection rules can include static rules and/or dynamic rules. Example data collection rules can be used to collect statistics for various packet flows, to detect starts of VM migrations, to detect starts of virtualized storage rebalancing, to collect virtual extensible local area network (VXLAN) flow statistics, to collect L2 hop counts between various MAC addresses, to collect QoS statistics, to collect MTU configurations, to collect equal-cost multi-path (ECMP) routing hash policies, to collect routing changes, etc. The example telematics engines 406a-d collect such information periodically and send the telematics-collected information to the example decision engine 410 for analysis by the example analytics engine 408 and to identify subsequent responsive action based on such telematics-collected information.

In some examples, the example telematics engines 406a-d are used to implement the example probe detectors 114 of FIG. 1. In such examples, the ACL of the telematics engines 406a-d are configured to detect the probe packets sent in response to a network configuration change detected by, for example, the example configuration change detector 108. In some examples, the probe ACL is configured with a unique source MAC address contained in the probe packets that can be used to determine if a probe passed through a network port. Additionally, and/or alternatively, the example telematics engines 406a-d implement the example configuration change detector 108 of FIG. 1 by detecting changes in network configurations.

The example decision engine 410 runs on a VM and is provided to make decisions based on analyses of the telematics-collected information received from the telematics agents 406a-d. For example, the decision engine 410 can program the resource configuration agents 412a-c based on analyses of the telematics-collected information performed by the analytics engine 408. In some examples, the telematics-collected information is low-level primitive data, and the decision engine 410 is configured to identify high-level events based on such low-level primitive data. For example, if the telematics-collected information includes low-level primitive data indicative of statistics for various packet flows, the decision engine 410 may identify a high-level event such as a network misconfiguration or an under-provisioning of network resources based on too many dropped packets for certain packet flows. In another example, if the telematics-collected information includes low-level primitive data that reflects the start of a VM migration, the decision engine 410 identifies an imminent need for a large amount of network bandwidth to perform such VM migration. In yet another example, if the telematics-collected information includes low-level primitive data that reflects the start of virtualized storage rebalancing, the decision engine 410 identifies an imminent burst of virtualized storage traffic based on the possibility that a disk is either being added or deleted. In yet another example, if the telematics-collected information includes low-level primitive data that reflects VXLAN flow statistics, the decision engine 410 identifies use of large amounts of network bandwidth based on VM network usage reflected in the VXLAN flow statistics. In yet another example, if the telematics-collected information includes low-level primitive data that reflects L2 hop counts between various MAC addresses, the decision engine 410 identifies an opportunity to migrate VMs closer to one another (e.g., migrate VMs to server hosts that are in the same physical rack or on neighboring physical racks) based on collected L2 hop count information in combination with VXLAN flow statistics. In some examples, the example decision engine 410 implements the example component identifier 116, and the example configurer 118 of FIG. 1. Based on network configuration change detection telematics information received from the example telematics agents 406a-d, the decision engine 410 automatically determines whether a network configuration change has been detected. When a network configuration change is detected, the decision engine 410 configures a unique source MAC address into the probe ACLs of the telematics agents 406*a-d*, and the VDS 320 sends probe packets containing the unique source MAC. Based on probe receipt information obtained from the telematics agents 406*a-d*, the decision engine 410 identifies physical and virtual network components needing (re-) configuration, and changes the network configuration(s) of those components via their associated resource configuration agents 412*a-c*.

The example analytics engine 408 runs on a VM and is provided to analyze the telematics-collected information received from the telematics agents 406*a-d*. For example, the analytics engine 408 can perform big data analyses by periodically accessing the telematics-collected information and analyzing the information, for example, for any system misconfigurations and/or inconsistencies. Some example types of analyses include analyzing information collected using packet sniffers in physical switches to: detect elephant flows and optimize network resources to handle such elephant flows, identify security issues, identify out-of-order delivery of packets, identify network bottlenecks, identify MTU misconfigurations, etc. Another example type of analysis includes analyzing syslog (system log) messages to identify critical system issues.

The example resource configuration agents 412*a-c* provide hardware agnostic APIs, which can be accessed by the decision engine 410 to change hardware configurations of corresponding hardware resources (e.g., the ToR switches 210, 212, 216, 218; the spine switches 222; the NAS 308, etc.). In this manner, the example decision engine 410 can improve operating and/or communication performances and/or efficiencies of the virtual server rack 206 (FIG. 2) by programming configurations of hardware resources via the resource configuration agents 412*a-c* in response to different events detected based on the analyses of the telematics-collected information performed by the analytics engine 408.

While an example manner of implementing the network configurer 102 of FIG. 1 is illustrated in FIG. 4, one or more of the elements, processes and/or devices illustrated in FIG. 4 may be combined, divided, re-arranged, omitted, eliminated and/or implemented in any other way. Further, the example telematics agents 406*a-d*, the example VDS 320, the example decision engine 410, the example resource configuration agents 412*a-c* and/or, more generally, the example network configurer 102 of FIG. 1 may be implemented by hardware, software, firmware and/or any combination of hardware, software and/or firmware. Thus, for example, any of the example telematics agents 406*a-d*, the example VDS 320, the example decision engine 410, the example resource configuration agents 412*a-c* and/or, more generally, the example network configurer 102 of FIG. 1 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of telematics agents 406*a-d*, the VDS 320, the decision engine 410, the resource configuration agents 412*a-c* and/or, more generally, the network configurer 102 is/are hereby expressly defined to include a non-transitory computer-readable storage device or storage disk such as a memory, a DVD, a CD, a Blu-ray disk, etc. including the software and/or firmware. Further still, the example network configurer 102 may include one or more elements, processes and/or devices in addition to, or instead of, those illustrated in FIG. 4, and/or may include more than one of any or all of the illustrated elements, processes and devices.

Figure 5A:
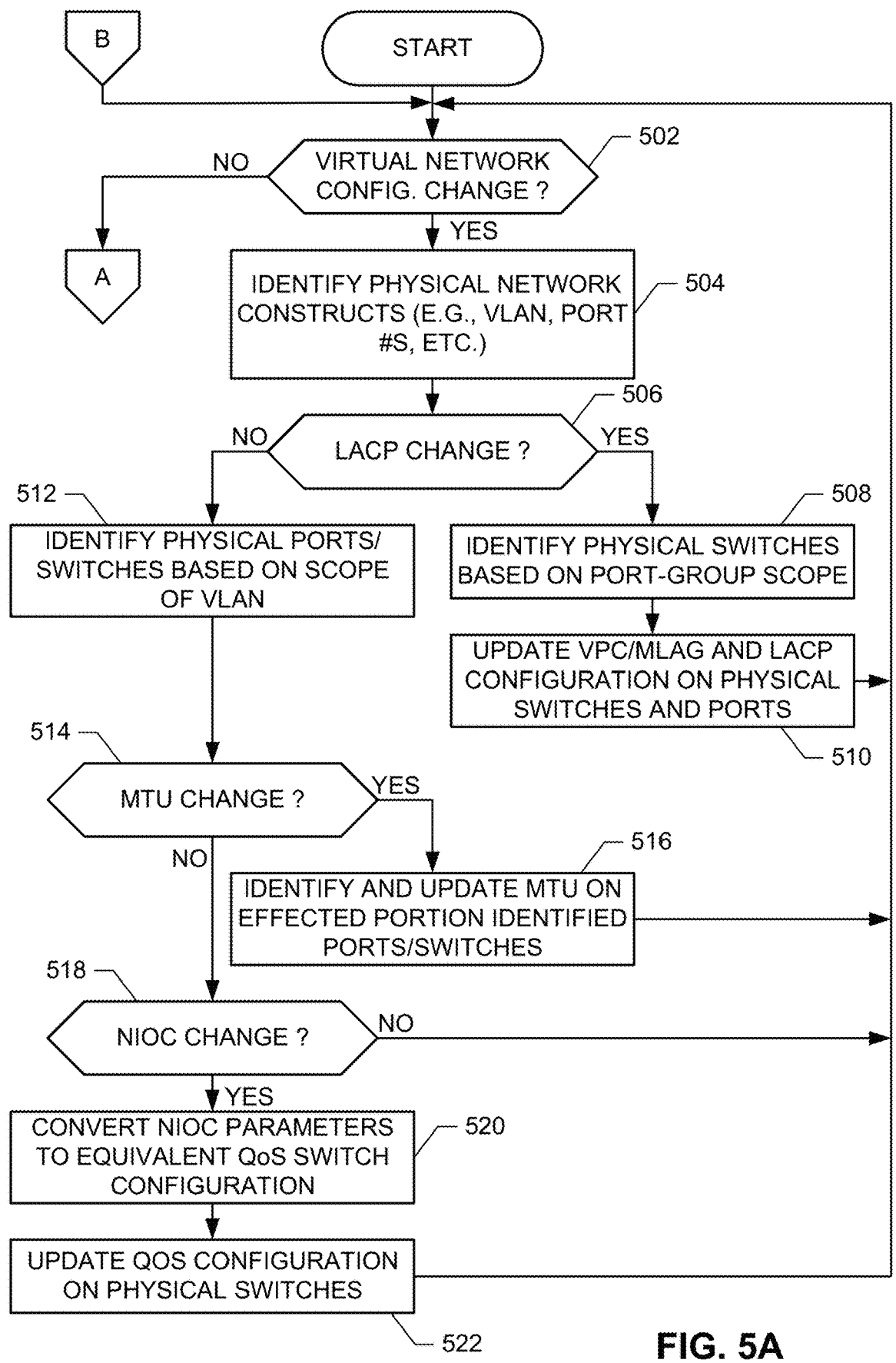
FIGS. 5A and 5B depict a flowchart representing example computer-readable instructions that may be executed to implement the example network configurer of FIGS. 1 and 4 to configure network resources of software defined data centers.
Figure 5B:
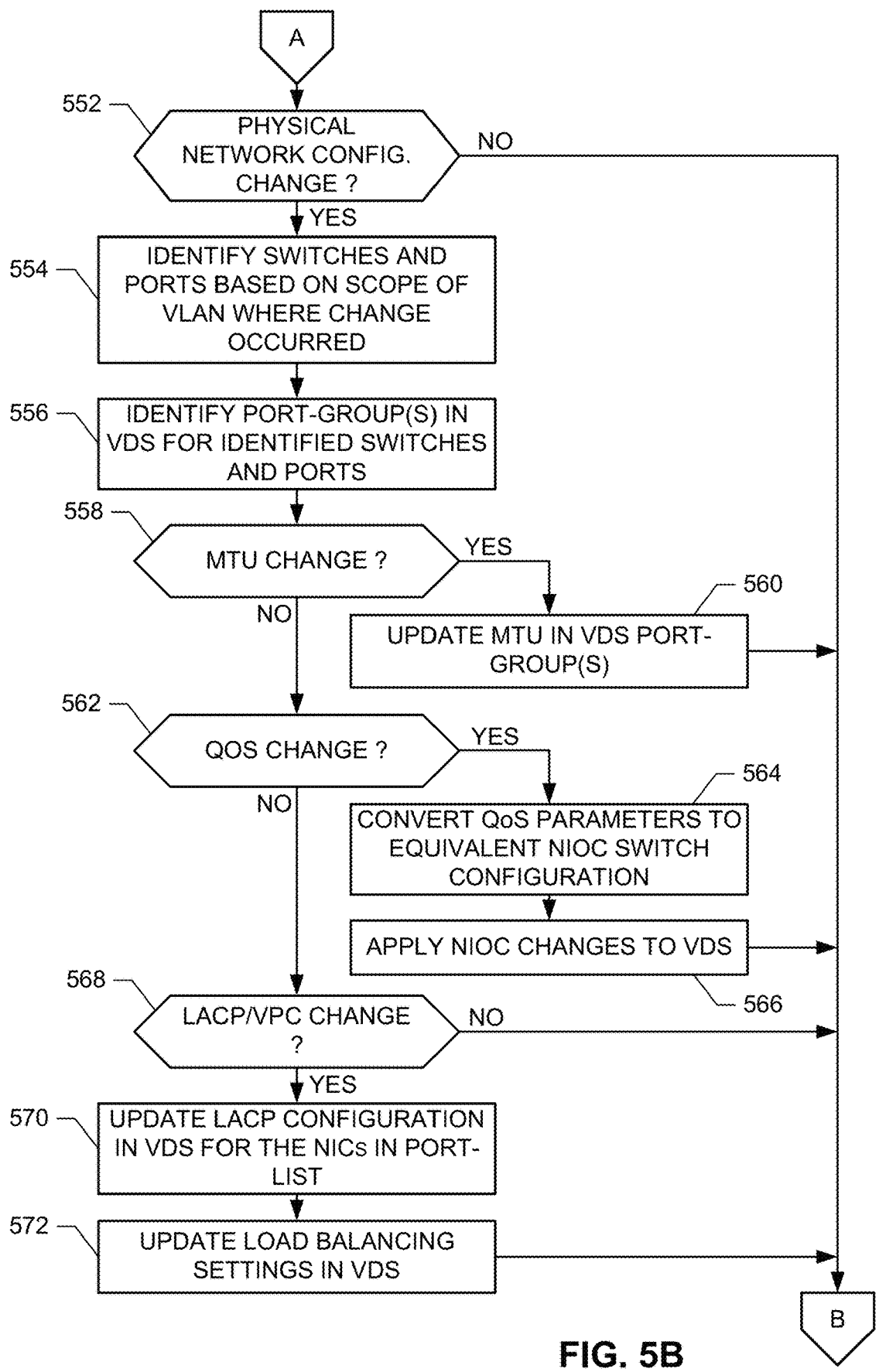

FIGS. 5A, 5B are flowcharts, and FIGS. 6 and 7 are pseudo-code representative of example computer-readable instructions for implementing the network configurer 102 shown in FIG. 1 and FIG. 4. In this example, the computer-readable instructions implement a program for execution by a processor such as the processor 810 shown in the example processor platform 800 discussed below in connection with FIG. 8. The program may be embodied in software stored on a non-transitory computer-readable storage medium such as a CD, a floppy disk, a HDD, a SSD, a DVD, a Blu-ray disk, or a memory associated with the processor 810, but the entire program and/or parts thereof could alternatively be executed by a device other than the processor 810 and/or embodied in firmware or dedicated hardware. Further, although the example program is described with reference to the flowchart illustrated in FIGS. 5A and 5B, and the pseudo-code of FIGS. 6 and 7, many other methods of implementing the example network configurer 102 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware.

The example processes of FIGS. 5A, 5B, 6 and 7 may be implemented using coded instructions (e.g., computer-readable instructions and/or machine-readable instructions) stored on a non-transitory computer-readable and/or machine-readable medium such as a HDD, a SSD, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable and/or machine-readable storage device and/or storage disk and to exclude propagating signals and to exclude transmission media.

The example programs of FIGS. 5A, 5B, 6 and 7 will be described hereafter in connection with the illustrated example of FIG. 4. However, the example programs of FIGS. 5A, 5B, 6 and 7 apply equally to the illustrated example of FIG. 1.

The example program of FIGS. 5A and 5B includes, at block 502, the example telematics engines 406*a-d* checking for a configuration change in the example virtual network 104 (block 502). For example, the configuration change detector 108 of FIG. 8 can monitor for configuration commands, packets, etc. sent to a network component. If a configuration change is detected (block 502), the example decision engine 410 (FIG. 4) identifies physical network constructs (e.g., VLAN, port group, etc.) associated with the detected configuration change (block 504). For example, the configuration change in the virtual network will be associated with a particular virtual port or switch, and the network construct(s) associated with the particular virtual port or switch can be identified.

If the example decision engine 410 determines that the configuration change was an LACP change (block 506), the decision engine 410 identifies impacted physical ports/switches based on port-group scope (block 508). For example, the decision engine 410 can execute the example pseudo-code of FIG. 6. The example decision engine 410 uses the resource configuration agents 412*a-c* associated with the identified physical ports/switches to update the virtual private cloud (VPC)/multichassis link aggregation (MLAG) and/or LACP configuration on the identified physical switches and ports (block 510), and control proceeds to block 502 to check for another network configuration change.

Returning to block 506, if a network configuration change other than an LACP change is detected (block 506), the example decision engine 410 identifies impacted physical ports/switches based on the scope of the VLAN associated with the detected change (block 512). For example, the decision engine 410 can execute the example pseudo-code of FIG. 6. If a telematics engine 406*a-d* detects a network configuration in the form of an MTU change (block 514), the example decision engine 410 identifies which of the switches identified in block 512 need updates (e.g., by executing the example pseudo-code of FIG. 7) and uses the resource configuration agents 412*a-c* (FIG. 4) to identify the portion of the identified ports/switches effected by the MTU change (e.g., by executing lines 704 and 706 of the example pseudo-code of FIG. 7), and uses the resource configuration agents 412*a-c* associated with the effected physical ports/switches to update their MTU (block 516). For example, by executing the example pseudo-code of FIG. 7. Control proceeds to block 502 to check for another network configuration change.

Returning to block 514, if the network configuration change is not an MTU change (block 514) and a telematics engine 406*a-d* does not detect a NIOC change (block 518), control returns to block 502 to check for another network configuration change.

Otherwise, at block 520, the example decision engine 410 converts the changed NIOC parameters to their equivalent QoS switch configuration settings (block 520). For example, for each policy P in the NIOC policies that were modified, the example decision engine 410 identifies the VLANs associated with P, and creates a QoS policy for each identified VLAN that includes the bandwidth limits present in P. The decision engine 410 uses the resource configuration agents 412*a-c* associated with the identified physical ports/switches to update their QoS configuration settings (block 522). Control returns to block 502 to check for another network configuration change.

Returning to block 502, if a configuration change in the virtual network is not detected (block 502), control proceeds from block 502 in FIG. 5A to block 552 in FIG. 5B. If a configuration change is not detected in the physical network by a telematics engine 406*a-d* (block 552), control returns from block 552 in FIG. 5B to block 502 in FIG. 5B. If a telematics engine 406*a-d* detects a network configuration change in the physical network (block 552), the example decision engine 410 identifies impacted virtual ports/switches in the VDS 320 (FIGS. 3 and 4) based on scope of the VLAN where change occurred (block 554). The example decision engine 410 identifies port-groups associated with the identified virtual ports/switches (block 556). For example, the detected configuration change will be associated with a particular physical port and/or switch, and the virtual network construct(s) (e.g., VLAN, port-group in VDS 320) associated with the particular physical port or switch can be identified.

If a telematics engine 406*a-d* detects an MTU change (block 558), the example decision engine 410 uses the resource configuration agents 412*a-c* to update the MTU in the VDS port-groups (block 560). Control returns to block 502 in FIG. 5A to check for another network configuration change.

If, at block 562, a telematics engine 406*a-d* detects a QoS configuration change (block 562), the example decision engine 410 converts the changed QoS parameters to equivalent NIOC settings (block 564). The example decision engine 410 uses the resource configuration agents 412*a-c* to apple the NIOC changes in the port-groups to the VDS 320 (block 566). For example, for each policy P in the QoS policies that were modified on a switch, the example decision engine 410 identifies the VLANs associated with P, and creates a NIOC policy in the VDS 320 for each identified VLAN that includes the bandwidth limits present in P. Control returns to block 502 in FIG. 5A to check for another network configuration change.

If, at block 568, a telematics engine 406*a-d* detects an LACP or a VPC change, the example decision engine 410 updates the LACP configuration in the identified ports in the VDS 320 (block 570). The example decision engine 410 updates load balancing settings in the VDS 320 (block 572). For example, if LACP is enabled, the example decision engine 410 sets the load balancing policy in the VDS 320 to "Based on IP Hash," otherwise, the decision engine 410 sets the load balancing policy in the VDS 320 to "Explicit Failover." Control returns to block 502 in FIG. 5A to check for another network configuration change.

If, at block 568, none of the telematics engines 406*a-d* detects an LACP or VPC change, control returns to block 502 in FIG. 5B to check for another network configuration change.

The example pseudo-code of FIG. 6 starts with the decision engine 410 clearing local variables (lines 602). The pseudo-code of FIG. 6 sets an ACL probe on each port of each identified switch (lines 604). For example, the switches can be identified at block 504 of FIG. 5A. The example decision engine 410 directs the VDS 320 to send probe packets (line 606). The decision engine 410 polls the telematics engines 406*a-d* associated with every switch and port for receipt of probe packets and creates a list of affected switches and ports (line 608).

The example pseudo-code of FIG. 7 starts with the decision engine 410 identifying the switches and ports in an identified VLAN (line 702), e.g., by executing the example pseudo-code of FIG. 6. The example decision engine 410 sets an ACL probe on each of the identified switches and port (line 704). The example decision engine 410 directs the VDS 320 send a probe packet with a packet size set to a new MTU (lines 706). The example decision engine 410 polls the telematics engines 406*a-d* associated with every port/switch to identify ports/switches that did not receive probe packet with the new MTU, it changes the MTU of those ports/switches (line 708).

FIG. 8 is a block diagram of an example processor platform 800 capable of executing the instructions of FIGS. 5A, 5B, 6 and 7 to implement the apparatus of FIG. 1 and FIG. 4. The processor platform 800 can be, for example, a workstation, a server, a personal computer, a blade PC, a blade server, or any other type of computing device.

The processor platform 800 of the illustrated example includes a processor 810. The processor 810 of the illustrated example is hardware. For example, the processor 810 can be implemented by one or more integrated circuits, logic circuits, microprocessors, GPUs, DSPs or controllers from any desired family or manufacturer. The hardware processor may be a semiconductor based (e.g., silicon based) device. In this example, the processor 810 implements the example network configurer 102, the configuration change detector 108, the example prober 112, the example component identifier 116, the example configurer 118, the example telematics engines 406a-d, the example resource configuration agents 412a-c, the example decision engine 410, and the example VDS 320.

The processor 810 of the illustrated example includes a local memory 812 (e.g., a cache). The processor 810 of the illustrated example is in communication with a main memory including a volatile memory 814 and a non-volatile memory 816 via a bus 818. The volatile memory 814 may be implemented by Synchronous Dynamic Random-Access Memory (SDRAM), Dynamic Random-Access Memory (DRAM), RAMBUS® Dynamic Random-Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB) interface, a Bluetooth®, a near field communication (NFC) interface, and/or a peripheral component interface (PCI) express interface.

In the illustrated example, one or more input devices 822 are connected to the interface circuit 820. The input device(s) 822 permit(s) a user to enter data and/or commands into the processor 810. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, etc.) a tactile output device, a printer and/or a speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or NIC to facilitate exchange of data with external machines (e.g., computing devices of any kind) via a network 826 (e.g., an Ethernet connection, a digital subscriber line (DSL), a telephone line, a coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, CD drives, Blu-ray disk drives, redundant array of independent disks (RAID) systems, and DVD drives.

Coded instructions 832 including the coded instructions of FIGS. 5A, 5B, 6 and 7 may be stored in the mass storage device 828, in the volatile memory 814, in the non-volatile memory 816, and/or on a removable tangible computer-readable storage medium such as a CD or DVD.

From the foregoing, it will be appreciated that example methods, apparatus and articles of manufacture have been disclosed that improve the correctness and operation of SDDCs by ensuring the configuration of physical networks and virtual networks remain compatible and working properly. From the foregoing, it will be appreciated that methods, apparatus and articles of manufacture have been disclosed which enhance the operations of a computer by obviating the need for the operator of a virtual network, or the operator of the physical network to have visibility into the other network to keep their configurations compatible. By automatically analyzing the affected networks, the operator of either network can be assured that any intended changes are appropriately made in the other network. Furthermore, example methods, apparatus, and/or articles of manufacture overcome inaccuracies and inability in the prior art to self-perform cross-configure physical and virtual networks in SDDCs.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising
   detecting a first configuration change to a new maximum transmission unit (MTU) for a first component of a first one of a virtual network or a physical network, the virtual network to provide networking for a virtual computing system, and the physical network to implement the virtual network;
   monitoring, by iterating through switches in a virtual cloud management system and iterating through ports of the switches to install, on the ports, a probe access control list rule identifying a predetermined media access control address of a sender of a probe packet, to identify ports of a network switch for the probe packet;
   identifying, by executing an instruction with a processor, a second component of a second different one of the virtual network or the physical network corresponding to the first component based on a detection of a probe packet received by the second component, wherein the probe packet satisfies the access control list rule including the media access control address of the sender of the probe packet;
   sending a second probe packet with packet size set to the new MTU to the identified ports;

detecting a port of the second component did not receive the probe packet with the new MTU; and in response to the detection, making a second configuration change to the second component to configure the portion for the new MTU.

2. The method of claim 1, further including sending the probe packet to identify the second component.

3. The method of claim 1, wherein the first one of the virtual network or the physical network is the virtual network, and the probe packet is sent on a virtual local area network associated with the first component.

4. The method of claim 1, wherein the probe packet is sent by a virtual distributed switch.

5. The method of claim 1, wherein the first configuration change includes at least one of a network I/O control (NIOC) change, a link aggregation control protocol (LACP) change, a virtual private cloud (VPC) change, or a Quality-of-Service (QoS) change.

6. An apparatus, comprising:
a change detector to detect a first configuration change to a new maximum transmission unit (MTU) for a first component of a first one of a virtual network or a physical network, the virtual network to provide networking for a virtual computing system, and the physical network to implement the virtual network;
a component identifier to:
monitor, by iterating through switches in a virtual cloud management system and iterating through ports of the switches to install, on the ports, a probe access control list rule identifying a predetermined media access control address of a sender of a probe packet, to identify ports of a network switch for the probe packet; and
identify, by executing an instruction with a processor, a second component of a second different one of the virtual network or the physical network corresponding to the first component based on a detection of a probe packet received by the second component, wherein the probe packet satisfies the access control list rule including the media access control address of the sender of the probe packet;
send a second probe packet with packet size set to the new MTU to the identified ports;
detect a port of the second component did not receive the probe packet with the new MTU; and
a configurer to, in response to the detection, make a second configuration change to the second component to configure the portion for the new MTU.

7. The apparatus of claim 6, wherein the probe packet identifies the second component when the probe packet satisfies a criterion in the probe access control list rule on the second component.

8. The apparatus of claim 6, wherein the first one of the virtual network or the physical network is the virtual network, and the probe sender is to send the probe packet on a virtual local area network associated with the first component.

9. The apparatus of claim 6, further including a virtual distributed switch implementing the probe sender.

10. A non-transitory computer-readable storage medium comprising instructions that, when executed, cause one or more processors to perform at least the operations of:
detecting a first configuration change to a new maximum transmission unit (MTU) for a first component of a first one of a virtual network or a physical network, the virtual network to provide networking for a virtual computing system, and the physical network to implement the virtual network;
monitoring, by iterating through switches in a virtual cloud management system and iterating through ports of the switches to install, on the ports, a probe access control list rule identifying a predetermined media access control address of a sender of a probe packet, to identify ports of a network switch for the probe packet;
identifying a second component of a second different one of the virtual network or the physical network corresponding to the first component based on a detection of a probe packet received by the second component, wherein the probe packet satisfies the access control list rule including the media access control address of the sender of the probe packet;
sending a second probe packet with packet size set to the new MTU to the identified ports;
detecting a port of the second component did not receive the probe packet with the new MTU; and
in response to the detection, making a second configuration change to the second component to configure the portion for the new MTU.

11. The non-transitory computer-readable storage medium of claim 10, wherein the predetermined media access control address represents a source media access control address.

12. The non-transitory computer-readable storage medium of claim 10, wherein the first one of the virtual network or the physical network is the virtual network, and the probe packet is sent on a virtual local area network associated with the first component.

* * * * *